Figure 1:
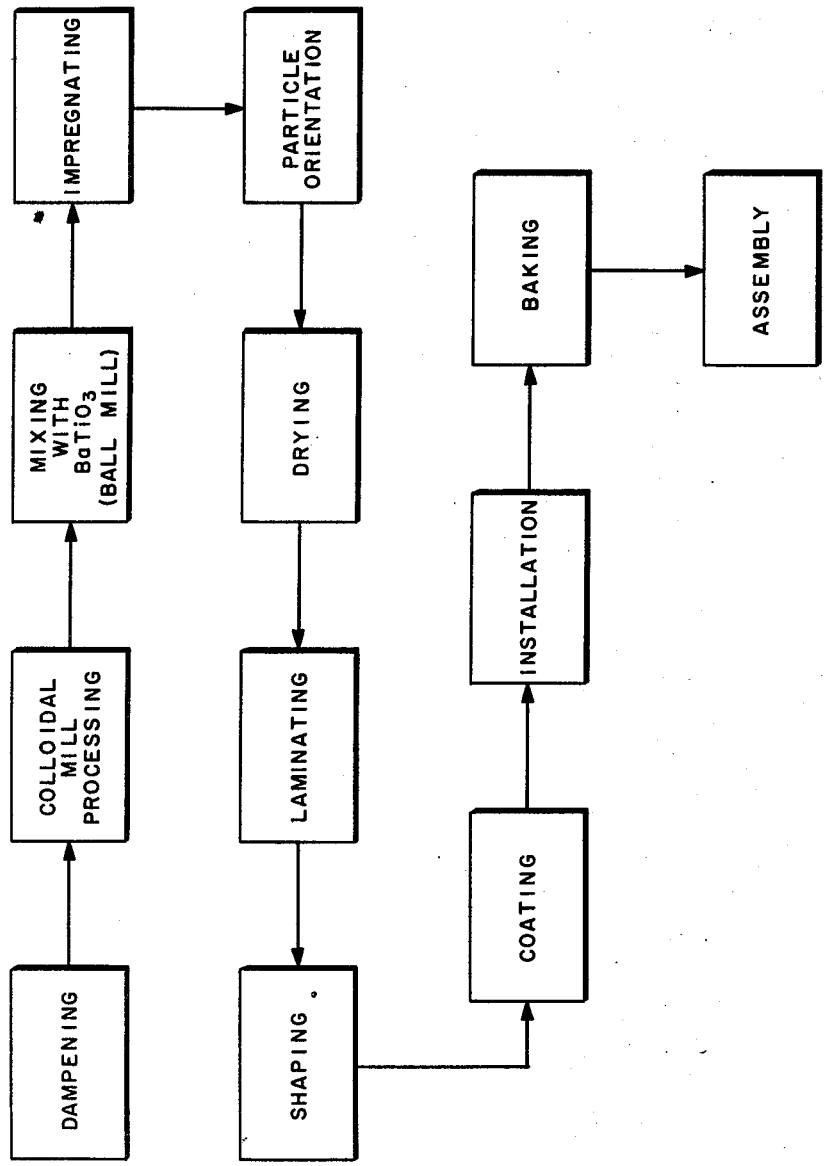

INVENTORS
ALVIN R. SALTZMAN
JACK ROSEN
ATTORNEYS

June 3, 1958  A. R. SALTZMAN ET AL  2,837,720
ATTENUATION DEVICE AND MATERIAL THEREFOR
Filed Aug. 31, 1953  2 Sheets-Sheet 2

INVENTORS
ALVIN R. SALTZMAN
JACK ROSEN
BY

H.F. Ross
ATTORNEYS

United States Patent Office 2,837,720
Patented June 3, 1958

2,837,720

ATTENUATION DEVICE AND MATERIAL THEREFOR

Alvin R. Saltzman, Willow Grove, and Jack M. Rosen, Levittown, Pa.

Application August 31, 1953, Serial No. 377,745

3 Claims. (Cl. 333—22)

(Granted under Title 35, U. S. Code (1952), sec. 266)

The invention described herein may be manufactured and used for or for the Government of the United States of America for governmental purposes without the payment of any royalties thereon or therefor.

This invention relates to an improved dummy load for absorption of electromagnetic wave energy.

The wide use of dummy loads and similar attenuating devices in connection with high frequency wave transmission emphasizes the importance of an efficient energy absorbing material for the dummy loads. A difficulty attendant to the use of conventional dummy loads and related devices is the fact that wave energy reflection is produced by the presence of the energy absorbing material used with them. This reflection occurs when the wave impedance of the material is not purely resistive but has a reactive component. Dissipation of either the electric field or the magnetic field energy of a translated wave produces a reactive component in the otherwise purely resistive wave impedances of the wave propagation path which is proportional in amount to the rate of attenuation per wave length of the translated wave. Devices providing for a small rate of attenuation of either of the field energies separately are subject to undesriable space and expense considerations.

Attempts to minimize reflection in wave guides, for example, by shaping the resistive material to a form selected to minimize reflection are somewhat satisfactory. However, regardless of the shape, it is difficult to avoid reflection in a limited space. This is because substantial energy dissipation in a limited space requires such large values of energy attenuation per wave length of the translated wave that dissipation of either the electric field energy or the magnetic field energy by itself causes a prohibitive amount of reactive component in the wave impedance presented in the translated wave. Accordingly, in the interest of space considerations, the best approach to the problem appears to be an arrangement which provides for a balance between the two kinds of reactive components caused by the electric field and magnetic field energy dissipations, such as a wave guide having incorporated therein an electromagnetic wave energy absorbing material having a composition which will effect a cancellation of the above reactive components.

A further disadvantage of present dummy loads in which a substantial amount of power is dissipated is the fact that the energy absorbing material used in them does not provide a linear dissipation of energy throughout the load, thus resulting in an uneven distribution of temperature with consequent formation of "hot spots" and expansion of the material to cause separation from the dummy load wall, and arcing.

It therefore is an object of this invention to provide an electromagnetic wave energy absorbing element incorporating an electromagnetic wave energy absorbing material adapted to absorb substantial amounts of wave-signal energy in a small space and having a wave impedance substantially purely resistive.

It is another object of the invention to provide an electromagnetic wave energy absorbing element incorporating an electromagnetic wave energy absorbing material, adapted to be interposed in a non-dissipative wave propagation path having a predetermined wave impedance, which is capable of absorbing substantial amounts of wave energy yet has a substantially purely resistive wave impedance equal to that of the non-dissipative wave propagation path.

It is still another object of this invention to provide an energy absorbing material for dummy loads which produces a linear dissipation of energy throughout the load.

It is a further object of this invention to provide a suitable electromagnetic wave energy absorbing element which will maintain its mechanical strength when subjected to temperatures arising from dissipation of substantial amounts of electromagnetic wave energy.

The electromagnetic wave energy absorbing material of this invention comprises an isotropic vehicle of relatively low dielectric constant silicone resin into which is incorporated an electrically conductive magnetically permeable material such as iron, a resistive material such as carbon and a high dielectric constant material, barium titanate. The particles of conductive and resistive material preferably have a plate-like substantially oblong or ellipsoid shape, the short dimension being very small compared to the long dimension, of the order of five or six to one. The process by which the material is made insures that the particles of conductive and resistive material are individually insulated and separated by small spaces. Laminae from which the energy absorbing element are constructed are made of fiber glass coated and impregnated with the material preferably with a major portion of at least the particles of conductive substance therein having their long axes substantially parallel. The dummy load comprises a wave guide or related structure containing a built up element of laminae preferably coated with the energy absorbing material, with the long axes of at least the conductive particles of the material oriented substantially parallel, thus making possible the positioning of the element in the dummy load with these axes normal to the vector of the electrical field of the translated wave.

The process for making the element comprises first making a vehicle by ball milling a silicone resin with a mixture of barium titanate crystals, and iron and carbon particles which have preferably been processed in a colloidal mill to form them into flakes having a flat ellipsoidal shape. Glass fiber tape is then impregnated with the vehicle and positioned with the long dimension of the tape vertically arranged so as to align a major portion of at least the iron particles with their long axes parallel to the long dimension of the tape. This alignment results from the forces exerted on the particles by surface tension and gravity. Particle orientation may also be obtained by application of a magnetic field. After drying to tackiness, layers of the impregnated fiber glass tape are compressed to form a laminated structure in which the long axes of a major portion of at least the conductive particles in all the layers are substantially parallel. The finished tape is cut to the desired shape. The product is then secured in a wave guide or similar attenuation device and baked to remove volatile solvent.

Figure 2:
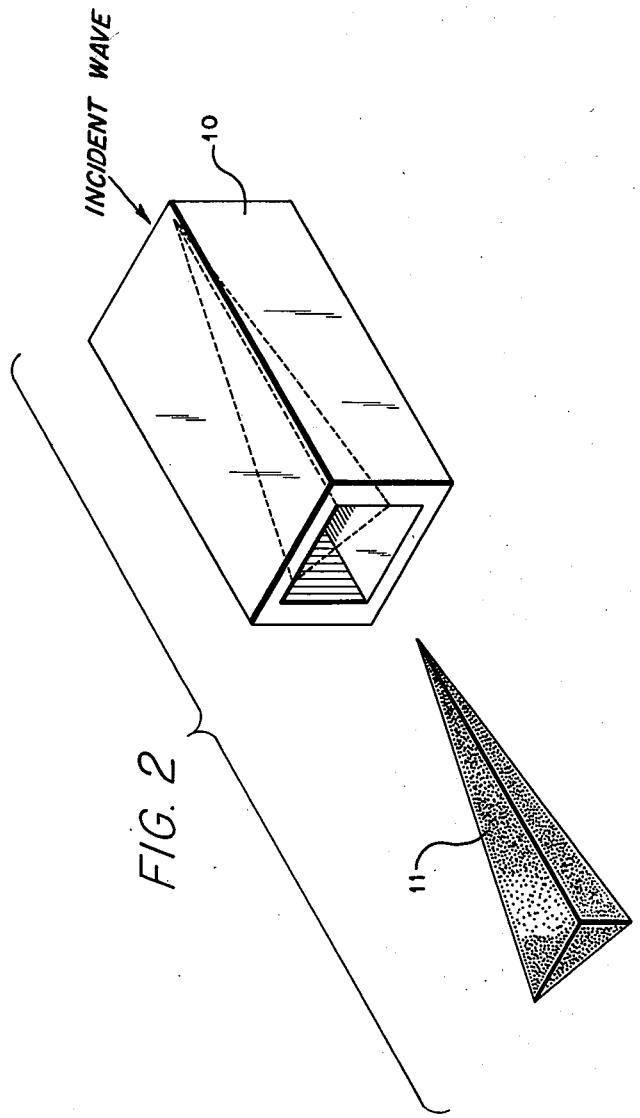

The exact nature of this invention, as well as other objects and advantages thereof, will be readily apparent from a consideration of the following specification relating to the annexed drawings in which:

Fig. 1 is a flow chart representing the process for making the dissipative element of the inventive attenuation device, and Fig. 2 is an isometric view of the disassembled dummy load showing a section of a wave guide and the dissipative element of this invention shaped to fit in the wave guide.

Referring to Fig. 2 an illustrative embodiment of the invention, a wave guide 10 is shown which is made of conductive material such as copper. The numeral 11 represents a block of the laminated element having laminae impregnated with the electromagnetic wave energy absorbing material and designed to fit into the wave guide 10 as shown by dotted lines to form the dummy load. The energy absorbing material comprises the highly resistive substance graphite, the highly conductive and magnetic substance iron, a dielectric binder of Dow Corning silicone resin #993 and barium titanate, a compound having a high dielectric constant. The backing substance of the laminae is high temperature resistant fiber glass.

The conductive and resistive particles of the material have at least one dimension small in relation to the wave length of the translated wave signal, the term "particle" as used herein and in the claims to be interpreted accordingly. For maximum efficiency in the preferred modification using oblong shaped particles the particles of magnetic material when incorporated in the attenuation device should be aligned with their long dimensions normal to the vector of the electrical field of the translated wave and the resistive particles should be aligned with their long dimensions normal to the vector of the magnetic field. The relative amounts of dielectric material to conductive material are so proportioned with respect to their magnetic permeabilities and dielectric constants as to give a ratio substantially equal to a like ratio for the wave propagation path for the mode of wave propagation. The proportions may be varied to produce various ratios. A purely resistive wave impedance of the energy absorbing material is obtained by proportioning the relative amounts of resistive and conductive material so that equal amounts of magnetic field energy and electric field energy dissipation are obtained, as the two kinds of dissipation tend to cause opposite reactive components in the wave impedance. The particles of high resistance material and the particles of conductive material are dispersed spatially in the dielectric plastic material in such a manner and are of such size and configuration as to cause substantial dissipation of the electric and magnetic energy, respectively, of the translated wave. The particles are individually insulated by the resin. The resistive material may be carbon or graphite and the conductive material is preferably iron but other metals may be used. The additional dielectric material, barium titanate, is uniformly dispersed throughout the mixture. Due to its high dielectric properties, its presence contributes significantly to increasing the effective dielectric constant of the dielectric binder comprising the silicone resin and fiber glass tape, which have relatively low dielectric constants. The inherent ferroelectric properties of barium titanate are also believed to enhance the energy absorbing properties of the dummy load. Through the use of this compound most desired ratios of dielectric constant to magnetic permeability are readily obtained for the material. The barium titanate inclusion combined with a generally tapered construction of the dissipative element provides for uniform dissipation of heat over a greater volume of the dissipation material thus reducing the possibility of "hot spots" due to accumulation of power in a small volume.

Referring now to Fig. 1, the laminae of the energy absorbing element are made as follows: the iron and carbon particles having a dimension less than the wave length of the translated wave are dampened to wetness and processed in a colloidal mill to produce a flat ellipsoidal shaped particle. A mixture is made of these particles with barium titanate and the mixture dried. A silicone resin is then added to the mixture and the product milled in a ball mill to form a suspension of the particles in the resin individually insulated and separated by minute distances. A milling time of about 48 hours is preferred. Laminae of impregnated glass tape are made by thoroughly impregnating strips of glass tape with the suspension by dipping or other means. The tape is removed from the suspension and suspended with its long dimension vertical. This provides orientation of a major portion of at least the magnetic particles with their long axes parallel to the long dimension of the strip, permitting subsequent assembly of a laminated block or element in which the long dimension of a major portion of at least the iron particles of all the layers can be made normal to the vector of the electrical field of the translated wave. About twelve hours drying time has proved satisfactory to produce a tape which has a tacky surface. The laminated element is made by assembling laminae of the impregnated fiber glass tape with the direction of magnetic particle orientation uniform for all layers and compressing into a laminated structure. The laminate is then cut to the desired shape, the shape being tetrahedral in the illustrative embodiment of the block 11, for use in a wave guide or related device. Other shapes and other structures than that described above may obviously be used. For example, elements may be constructed in which the dielectric and conductive materials constitute separate layers.

The contact surfaces of the element are coated with a high temperature adhesive, the element secured in the wave guide, and the assembly baked to remove volatile solvent. Baking is begun at about 40° centigrade and after several hours the temperature is increased to 80° centigrade and baking continued for about two hours. Over a period of 12 hours the temperature is gradually raised from 80° centigrade to about 170° centigrade and continued at this temperature for about eight hours.

The dummy load of the invention gave a voltage standing wave ratio of 1.05 or less. A dummy load containing four cubic inches of the material gave 80–100 watts dissipation or about 25 watts per cubic inch.

The improved results obtained are believed to be due to the use of ellipsoidal shaped particles; the described orientation of the particles; the use of a dielectric binder comprised of high temperature resistant materials, fiber glass and silicone resin; and the spatial dispersion of high dielectric barium titanate particles to provide a desirable ratio of effective dielectric constant to effective magnetic permeability for the dissipative element. An added advantage stems from the fact that even though the element does not have the same coefficient of expansion as the metal guide, its elasticity prevents setting up of shearing stresses between it and the metal case when excessive temperature changes occur.

From the above description it is seen that there has been provided an electromagnetic wave energy absorbing element incorporating a material which is capable of absorbing comparatively large amounts of electromagnetic wave energy in a limited space with good uniformity of temperature distribution, the material having a substantially pure resistive wave impedance so that it does not reflect wave-signal energy. Further, the invention provides a method for making the dissipative element incorporating the materials herein set forth.

Obviously many modifications and variations of the present invention are possible in the light of the above teachings. It is therefore to be understood that within the scope of the appended claims the invention may be practiced otherwise than as specifically described.

What is claimed is:

1. An electromagnetic wave energy absorbing element for attenuation devices comprising; laminae of a backing of fiber glass impregnated with an electromagnetic wave energy absorbing material comprising; a resinous dielectric vehicle including barium titanate particles in spatial dispersion therein; particles of highly conductive magnetically permeable material, and particles of highly resistive material incorporated in said resinous dielectric vehicle.

2. The element of claim 1 in which at least the conductive particles are ellipsoidal in shape and the long axes of said conductive particles are aligned substantially parallel.

3. An electromagnetic wave energy absorbing element for attenuation devices comprising, laminae of a backing of fiber glass impregnated with an electromagnetic wave energy absorbing material comprising: a quantity of dielectric material including barium titanate; a quantity of highly conductive magnetically permeable material of individually insulated particles of generally ellipsoidal shape and having a long dimension small in relation to the wave length of the electromagnetic wave to be translated thereby and effective to cause dissipation of the magnetic energy of said translated wave, the long dimension of said ellipsoidal shaped particles being in substantially parallel orientation and normal to the electric vector of the translated wave; and a quantity of highly resistive material incorporated in said dielectric and conductive materials consisting of individually insulated particles having maximum dimensions small in relation to the wave length of said translated wave effective to cause substantial dissipation of said translated wave, the relative proportions of said conductive and resistive materials being adjusted to cause substantially equal amounts of magnetic field energy dissipation and electric field energy dissipation of the translated electromagnetic wave.

References Cited in the file of this patent

UNITED STATES PATENTS

| | | |
|---|---|---|
| 2,300,503 | Hamister et al. | Nov. 3, 1942 |
| 2,490,826 | Mochel | Dec. 13, 1949 |
| 2,567,379 | Kienow | Sept. 11, 1951 |
| 2,589,157 | Stalhane | Mar. 11, 1952 |
| 2,609,318 | Swentzel | Sept. 2, 1952 |
| 2,610,250 | Wheeler | Sept. 9, 1952 |
| 2,644,781 | Smolak et al. | July 7, 1953 |
| 2,649,396 | Witt et al. | Aug. 18, 1953 |
| 2,695,240 | Oshry | Nov. 23, 1954 |
| 2,730,597 | Podolsky et al. | Jan. 10, 1956 |
| 2,752,495 | Kroger | June 26, 1956 |